United States Patent Office 3,576,878
Patented Apr. 27, 1971

3,576,878
PROCESS FOR ISOLATING ANHYDROUS
N,O-DIMETHYLHYDROXYLAMINE
Earl W. Cummins, Wilmington, Del., assignor to E. I. du Pont de Nemours and Company, Wilmington, Del.
No Drawing. Filed Mar. 7, 1968, Ser. No. 711,171
Int. Cl. C07c 85/16
U.S. Cl. 260—583                                3 Claims

ABSTRACT OF THE DISCLOSURE

This invention teaches a method for continuously recovering anhydrous N,O-dimethylhydroxylamine from an aqueous system containing N,O-dimethylhydroxylamine methyl sulfate and benzaldehyde. The improvement comprises removing all of the benzaldehyde from the aqueous solution, liberating the amine from the residue by the addition of base and then quickly distilling off anhydrous N,O-dimethylhydroxylamine.

BACKGROUND OF THE INVENTION

This invention relates to an improved method for isolating anhydrous N,O-dimethylhydroxylamine from an aqueous solution containing benzaldehyde and N,O-ditemhylhydroxylamine methyl sulfate.

Heretofore, N,O-dimethylhydroxylamine has been isolated from the aqueous solution by extracting the solution with a solvent to remove the benzaldehyde followed by batch distillation to recover N,O-dimethylhydroxylamine. This procedure is taught in U.S. Pat. No. 3,337,631.

This prior art procedure has a number of disadvantages. For example, unless a number of extraction steps are performed, the removal of benzaldehyde is not complete. Complete removal of the benzaldehyde is necessary to prevent side reactions from reducing the yield of N,O-dimethylhydroxylamine.

In addition, the extracted aqueous N,O-dimethylhydroxylamine methyl sulfate is saturated with solvent. This complicates the ensuing isolation of N,O-dimethylhydroxylamine and can result in contamination of the final product with solvent.

The improved process of my invention eliminates these problems, simplifies the isolation of N,O-dimethylhydroxylamine and increases both the yield and purity of N,O-dimethylhydroxylamine.

SUMMARY OF THE INVENTION

In summary, I have discovered a process for isolating an N,O-dimethylhydroxylamine product of suitable purity for the preparation of agricultural chemicals in higher yields, better purity and at less cost than heretofore thought possible.

As herein discussed, the reaction system employed contains N,O-dimethylhydroxylamine methyl sulfate, benzaldehyde and water.

Before the N,O-dimethylhydroxylamine can be liberated from its salt and isolated, the benzaldehyde must be removed from the reaction system.

Initially, the majority of the benzaldehyde is decanted. The aqueous phase contains a small amount of benzaldehyde which is then removed by distillation in the presence of a counter current sulfuric acid scrub. The sulfuric acid solution employed as a counter current scrub contains at least 2.5 mole equivalents of acid per 100 mole equivalents of N,O-dimethylhydroxylamine.

After all of the benzaldehyde is removed, the effluent containing the dissolved N,O-dimethylhydroxylamine methyl sulfate is adjusted to a pH of from 6.5 to 8 by the addition of sodium hydroxide to liberate the N,O-dimethylhydroxylamine from its salt. The reaction proceeds as rapidly as the sodium hydroxide solution is mixed with the aqueous solution of N,O-dimethylhydroxylamine methyl sulfate.

The freed N,O-dimethylhydroxylamine is then isolated quickly from the system by distillation.

During the neutralization of the N,O-dimethylhydroxylamine methyl sulfate salt by addition of sodium hydroxide the temperature of the system is maintained within a range of from 30° C. to 60° C. and the hold-up time between neutralization and distillation is controlled at less than 5 minutes when the temperature is 30° C. the hold-up time being shortened as the system temperature is raised until the hold-up time is less than one minute when the neutralization is conducted at 60° C.

DESCRIPTION OF THE INVENTION

My invention relates to an improved process for the isolation of N,O-dimethylhydroxylamine from an aqueous solution containing benzaldehyde and N,O-dimethylhydroxylamine methyl sulfate.

To prepare this solution, α-phenyl-N-methylnitrone is treated with dimethylsulfate in an anhydrous medium to produce N-benzylidene-N-methoxy - N - methylammonium sulfate. The N-benzylidene-N-methoxy-N-methylammonium sulfate is hydrolyzed by adding excess water to the system at a temperature of from 25° to 95° C. This hydrolysis results in a two-phase system comprised of a benzaldehyde phase and an aqueous phase.

The benzaldehyde phase is separated by decantation.

The aqueous phase which remains contains N,O-dimethylhydroxylamine methyl sulfate and a small amount of benzaldehyde. This dissolved benzaldehyde must be removed before the N,O-dimethylhydroxylamine is liberated from its salt; otherwise, unwanted by-products will form.

Removal of the dissolved benzaldehyde is accomplished by feeding the aqueous phase to the middle of a stripping column equipped with a counter current scrubbing section above the feed. Heat is supplied to the bottom of the column. A sulfuric acid stream is employed as the counter current scrub to prevent the loss of any N,O-dimethylhydroxylamine which might vaporize during this distillation.

In the above described separation, it is critical that the counter current scrubbing stream contain at least 2.5 mole equivalents of sulfuric acid per 100 mole equivalents of N,O-dimethylhydroxylamine. An insufficient amount of acid can result in the loss of the N,O-dimethylhydroxylamine during this distilling.

A scrubbing stream with a concentration of higher than 10 mole equivalents of acid can be used without adverse effects, but it is uneconomic since a correspondingly larger amount of base will be needed later to neutralize the excess acid used.

The counter current scrubbing stream can contain from 2.5 to 10 mole equivalents of acid per 100 mole equivalents of N,O-dimethylhydroxylamine and preferably will contain from 3 to 7 mole equivalents of acid per 100 moles of N,O-dimethylhydroxylamine.

The overhead from the distillation column is a nonhomogeneous azeotrope composed of benzaldehyde and water.

The effluent from the bottom is an aqueous solution of N,O-dimethylhydroxylamine methyl sulfate and sulfuric acid essentially free of benzaldehyde.

The N,O-dimethylhydroxylamine is liberated from its salt by increasing the pH of the system from 6.5 to about 8 with sodium hydroxide solution.

At a system pH below 6.5, the yield of N,O-dimethylhydroxylamine is reduced because not all of the N,O-dimethylhydroxylamine will be released from its methyl sulfate salt and therefore will not be easily distillable.

The upper limit of the pH range was selected because pH's above this level result in reduced N,O-dimethylhydroxylamine yield due to formation of trimethylhydroxylamine.

It is, therefore, critical that the pH of the system be maintained between about 6.5 and 8 to obtain the high yield of pure product from the process of this invention.

It is also critical that the hold-up time between neutralization and distillation and the temperature at which the neutralization is conducted are carefully controlled in order to prevent the formation of undesirable trimethylhydroxylamine.

The rate at which trimethylhydroxylamine forms increases as the temperature of the system increases. Therefore, the length of the hold-up time between the neutralization of the system and isolation of the N,O-dimethylhydroxylamine in relation to the temperature will determine the amount of trimethylhydroxylamine in the final product.

According to the process of this invention, the neutralization of N,O-dimethylhydroxylamine methyl sulfate solution to a pH of from 6.5 to 8 is conducted at a temperature of from about 30° C. to 60° C. It is an object of this invention to obtain an N,O-dimethylhydroxylamine containing less than about 0.5% trimethylhydroxylamine.

The isolation of N,O-dimethylhydroxylamine is accomplished by feeding the aqueous solution to the middle of a distillation column, supplying heat to the bottom of the column, condensing the overhead vapors, returning part of the vapors as reflux and drawing off anhydrous N,O-dimethylhydroxylamine as the overhead product. The above described process results in a product containing less than 1.0% trimethylhydroxylamine and is of sufficient purity to be used in the synthesis of methoxy-urea herbicides.

In order that this invention may be better understood, the following example is presented.

EXAMPLE

One hundred five parts of 45.7% aqueous N-methylhydroxylamine sulfate and 106 parts benzaldehyde are mixed together in an agitated reactor. Aqueous sodium hydroxide (50%) is added gradually to the acidic mixture. During the addition, the pH of the aqueous phase is not allowed to exceed 6. When the temperature reaches 65° C., external cooling is applied to maintain the temperature of the system between 60 and 70° C. The reaction is complete when the pH remains stable at 6 with no further addition of sodium hydroxide. If the pH of the system should rise above 6 before the reaction is complete, it is adjusted back to 5 with sulfuric acid before resumption of the caustic feed.

The mixture is cooled to 40° C. and the phases are separated. The aqueous (lower) phase is discarded. The α-phenyl-N-methyl nitrone (upper) phase is dried by distilling out the water at a pot temperature of 90° C. under partial vacuum.

Sixty-six parts of dimethylsulfate is added with good agitation to the above residue during thirty minutes while the temperature is maintained below 90° C. by external cooling. After completion of the dimethylsulfate addition, the temperature is maintained at 90° C. by external heating for another 10 minutes. 137 parts of water is added. The reaction mass is then stirred at a temperature of about 55° C. for 10 minutes to allow complete hydrolysis. The mixture is cooled to 35° C. The phases are allowed to separate. The lower phase, an aqueous solution of N,O-dimethylhydroxylamine methyl sulfate is withdrawn. The upper benzaldehyde phase is recycled to "nitrone" formation described above.

The aqueous solution is then fed to the middle of a distillation column. Sufficient steam is fed to the bottom of the column to maintain the head temperature at about 98° C. Five parts of sulfuric acid, as a one normal solution, is added at the top of the column during the distillation as a counter current scrubbing stream to prevent loss of N,O-dimethylhydroxylamine.

The two-phase distillate of benzaldehyde and water is separated and the benzaldehyde phase is recycled to nitrone formation. The aqueous phase is discarded.

The bottoms from the distillation consists of a benzaldehyde free aqueous solutions of N,O-dimethylhydroxylamine methyl sulfate. This solution is cooled to 50° C. and neutralized in a continuous reactor to a pH of from 6.5 to 8 by the addition of 50% aqueous caustic. External cooling is used to maintain the temperature of the neutralized solution at 60° C. The hold-up time in the reactor is no more than one minute.

The neutralized solution is fed to the middle of a distillation column while steam is fed to the bottom of the column. The overhead vapors are condensed and a portion is returned as reflux, and the remaining anhydrous N,O-dimethylhydroxylamine containing less than 0.5% trimethylhydroxylamine is taken off as overhead.

I claim:

1. In a continuous process for recovering N,O-dimethylhydroxylamine from an aqueous system containing N,O-dimethylhydroxylamine methyl sulfate and benzaldehyde the improvement comprising the steps of:
   (a) eliminating the benzaldehyde from the system by decantation and then distillation in the presence of a counter current sulfuric acid scrubbing stream, said stream containing at least 2.5 mole equivalents of sulfuric acid per 100 mole equivalents of N,O-dimethylhydroxylamine in said system;
   (b) adding sodium hydroxide to the benzaldehyde-free system in sufficient quantity to raise the pH of the system to a pH of from 6.5 to 8;
   (c) controlling the hold-up time of the neutralized system between the addition of sodium hydroxide and isolation of N,O-dimethylhydroxylamine to prevent formation of more than 1.0% of trimethylhydroxylamine; and
   (d) collecting the freed N,O-dimethylhydroxylamine by distillation.

2. In a continuous process for recovering N,O-dimethylhydroxylamine from an aqueous system containing N,O-dimethylhydroxylamine methyl sulfate and benzaldehyde the improvements comprising the steps of:
   (a) eliminating the benzaldehyde from the system by decantation and then distillation in the presence of a counter current sulfuric acid scrubbing stream, said stream containing from 2.5 to 10 mole equivalents of sulfuric acid per 100 mole equivalents of N,O-dimethylhydroxylamine in said system:
   (b) adding sodium hydroxide to the benzaldehyde free system in sufficient quantity to raise the pH of the system to a pH of from 6.5 to 8;
   (c) maintaining said system at a temperature of from 30° to 60° C., said conditions being maintained for less than 5 minutes at 30° C. to less than one minute at 60° C.; and
   (d) isolating N,O-dimethylhydroxylamine by distillation from said system.

3. In a continuous process for recovering N,O-dimethylhydroxylamine from an aqueous system containing N,O-dimethylhydroxylamine methyl sulfate and benzaldehyde the improvements comprising the steps of:
   (a) eliminating the benzaldehyde from the system by decantation and then distillation in the presence of a counter current sulfuric acid scrubbing stream, said stream containing from 2.5 to 10 mole equivalents of sulfuric acid per 100 mole equivalents of N,O-dimethylhydroxylamine in said system;
   (b) adjusting the temperature of the system to 60° C.;
   (c) adding sodium hydroxide to the benzaldehyde free system in sufficient quantity to raise the pH of the system to 6.5 to 8;
(d) feeding the neutralized system to a steam distillation column within one minute after neutralization; and
(e) isolating N,O-dimethylhydroxylamine by steam distillation.

References Cited
UNITED STATES PATENTS
3,337,631 8/1967 Gerjovich et al. _ 260—583(DD)

CHARLES B. PARKER, Primary Examiner
R. L. RAYMOND, Assistant Examiner